Feb. 19, 1924.  1,484,345

G. STOELTING

JET MECHANISM

Filed May 23, 1923

Witnesses:
P. E. Weber

Inventor:
Gustav Stoelting
Young & Young,
Attorneys

Patented Feb. 19, 1924.

1,484,345

UNITED STATES PATENT OFFICE.

GUSTAV STOELTING, OF KIEL, WISCONSIN, ASSIGNOR TO STOELTING BROTHERS CO., OF KIEL, WISCONSIN.

JET MECHANISM.

Application filed May 23, 1923. Serial No. 641,027.

*To all whom it may concern:*

Be it known that I, GUSTAV STOELTING, a citizen of the United States, and resident of Kiel, in the county of Manitowoc and State of Wisconsin, have invented certain new and useful Improvements in Jet Mechanisms; and I do hereby declare that the following is a full, clear, and exact description thereof.

My invention relates to improvements in injectors, and particularly to that type adapted for the movement of fluids from one container to another.

The object of my invention is to provide an injector of the class described having its nozzle so constructed that the same may be moved from one branch of its casing to another.

A further object of my invention is to provide an injector having its various parts so arranged that the same may be conveniently assembled and disassembled in order to cleanse and sterilize the same.

In the accompanying drawings:—

Figure 1:
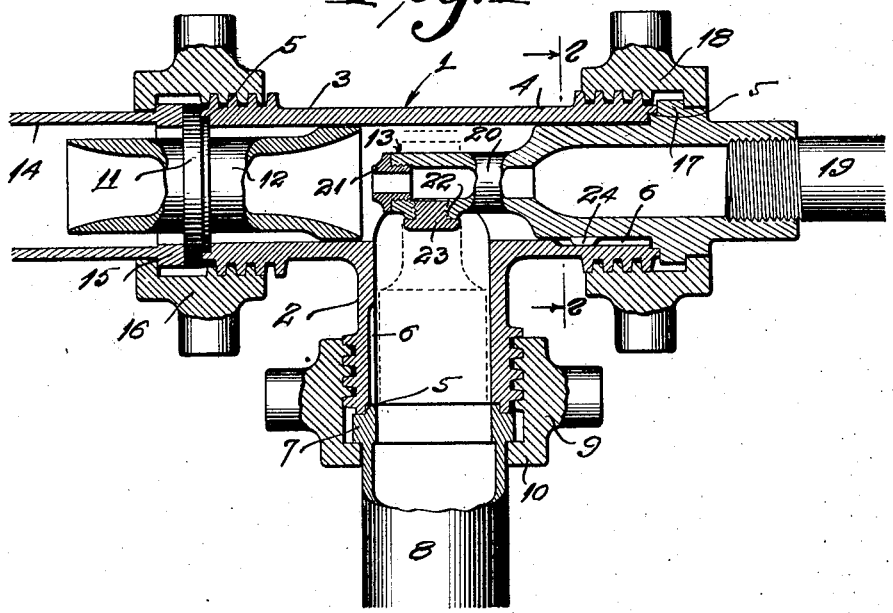
Figure 1 is a sectional view of a casing having therein my improved nozzle.
Figure 2:
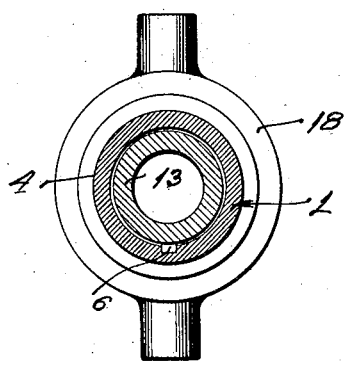
Figure 2 is a sectional view taken on the line 2—2 of Figure 1.

Referring to the accompanying drawings, wherein like reference characters denote corresponding parts throughout the several views, the numeral 1 designates the body of my novel injector and is preferably formed in one piece of the shape shown, the same having the downwardly extending branch 2 and the outwardly extending branches 3 and 4 which reach laterally from the branch 2 and in opposite directions, the latter being in alignment with each other. The exterior portion of each branch is threaded at its outer end for the purpose hereinafter described.

The end portion of each branch is provided with an annular recess 5 while the interior of the downwardly extending branch 2 and either one of the lateral branches, or both if so desired, is provided with a longitudinal key slot 6 the purpose of which will be apparent as the description proceeds.

The downwardly extending branch 2 has fitted within its annular recess the flanged end portion 7 of a pipe 8 through which the fluid to be conveyed by the injector is admitted into the body of the same. As disclosed by the drawings, the pipe 8 is detachably connected to the branch 2 by a clamping nut 9 the same engaging the threaded portion of the branch and provided with laterally extending lugs. The clamping nut 9 is provided with a flange 10 adapted to engage the flange on the pipe 8 and hold the latter in place.

The branch 3 has engaging its annular recess a stepped flange 11 carried by a discharge tube 12 which surrounds the outer portion of a nozzle 13, hereinafter to be described. The flanged portion of the tube 12 has engaging its outer portion a pipe section 14, the same being provided with a flange 15 and held to the branch 3 by means of a clamping nut 16 engaging the threaded portion of the branch 3.

The branch 4 has fitted within its annular recess a flange 17 carried by the inlet nozzle 13 and held in place by a clamping nut 18. The end portion of the nozzle 13 has threaded therein a pipe section 19 through which the steam or other fluid under pressure is admitted to the injector.

The nozzle 13 is provided with a reduced tubular portion 20 the end portion of which is interiorly threaded to receive therein the tip 21 while its side is provided with a threaded opening 22, the same being closed by a threaded plug 23. As disclosed in the drawings, the axis of the opening 22 is common to that of the branch 2, the purpose of which will be apparent as the description proceeds.

In order to hold the nozzle 13 within the branch 4 and prevent the same from turning therein I have arranged on the body of the former a key 24 which is adapted to fit within the key slot 6, previously referred to.

From the foregoing description, it will be understood that when the branch 2 is connected with a suitable source of water supply or other fluid supply, and fluid under pressure, preferably steam, is permitted to pass through the pipe 19, the said fluid will pass forcibly through the nozzle 13 and the suction created thereby will be sufficient to raise the fluid through the branch 2 and force the same through the discharge tube 12 to the point, or points desired.

In the event that it is desired to change the nozzle 13 from one branch to another, and particularly to a branch at right angles to its former position, the same is accomplished by removing the clamping nuts and fitting the nozzle 13 and its delivery pipe in place of the pipe 8, the latter being connected to the branch from which the nozzle was removed. Prior to this movement, however, the plug 23 is removed from the opening 22 and the discharge tip 21 is placed therein while the plug 23 is placed within the opening from which the tip 21 was removed, thus having the discharge of the nozzle through the opening 22 and in a direction similar to that previously obtained.

In this arrangement as the discharge takes place, suction is created and fluid is drawn through the branch 4, and in a manner similar to that hereinbefore described.

From the foregoing, it is thought that the construction, operation and many advantages of the herein described invention will be apparent to those skilled in the art, without further description, and it will be understood that various changes in the size, shape, proportion, and minor details of construction may be resorted to without departing from the spirit or sacrificing any of the advantages of the invention.

Having thus fully described my invention, what I claim as new and desire to claim by Letters Patent is:—

1. An injector having a main casing provided with branches, an inlet nozzle and a suction pipe secured to certain of said branches, and said inlet nozzle adapted to be connected to either of said branches and discharge through a common branch.

2. An injector having a casing provided with a plurality of branches, an inlet nozzle and a suction pipe secured to certain of said branches and adapted to be interchangeable, and said inlet nozzle adapted to discharge through a common branch, irrespective of the branch to which it is connected.

3. An injector having a casing provided with a plurality of branches, an inlet nozzle and a suction pipe secured to certain of said branches, a discharge pipe connected to another of said branches, said inlet nozzle and suction pipe adapted to be interchangeable with respect to their branches, and said inlet nozzle provided with means for maintaining its discharge in line with said discharge pipe.

4. A three-way casing having angularly disposed branches, a discharge tube detachably connected to one of said branches, a suction pipe detachably connected to either of the other branches, an inlet nozzle detachably connected to the other branch, and said inlet nozzle provided with means for directing its flow into said discharge tube irrespective of the branch to which it is connected.

5. An injector of the class described having a casing provided with angularly disposed branches, a discharge tube arranged within one of said branches, an inlet nozzle detachably connected to either of the other branches, said inlet nozzle having adjacent its outlet a second outlet at right angles to the former, means for closing either of said outlets and opening the other dependent upon the branch to which the inlet nozzle is connected, a suction pipe secured to the other branch, and said inlet nozzle adapted to discharge into said discharge tube.

6. An injector comprising a casing having angularly disposed branches, a discharge tube arranged in one branch, an inlet nozzle adapted to be connected to either of said remaining branches, said nozzle having a number of outlets one of which is opened, a suction pipe secured to the other branch, and said nozzle having its point of discharge in alignment with the axis of said discharge tube irrespective of which branch it is connected to.

In testimony that I claim the foregoing I have hereunto set my hand at Kiel, in the county of Manitowoc and State of Wisconsin.

GASTAV STOELTING.